US007224957B2

(12) United States Patent  
Spector

(10) Patent No.: US 7,224,957 B2  
(45) Date of Patent: May 29, 2007

(54) APPARATUS AND METHOD FOR BROADCASTING MESSAGES TO SELECTED GROUP(S) OF USERS

(76) Inventor: Shelley J. Spector, 474 Long Hill Dr., Short Hills, NJ (US) 07078

( * ) Notice: Subject to any disclaimer, the term of this patent is extended or adjusted under 35 U.S.C. 154(b) by 198 days.

(21) Appl. No.: 10/509,263

(22) PCT Filed: Mar. 16, 2004

(86) PCT No.: PCT/US2004/007959

§ 371 (c)(1),
(2), (4) Date: Sep. 27, 2004

(87) PCT Pub. No.: WO2004/084532

PCT Pub. Date: Sep. 30, 2004

(65) Prior Publication Data

US 2006/0059495 A1    Mar. 16, 2006

(51) Int. Cl.  
*H04M 11/04* (2006.01)
(52) U.S. Cl. .............. 455/404.2; 455/414.1; 455/426.1; 455/412.1
(58) Field of Classification Search ......... 455/404.2, 455/414.1, 426.1, 412.1, 412.2, 519, 416, 455/466; 370/260, 261; 379/202.01, 203.01, 379/204.01  
See application file for complete search history.

(56) References Cited

U.S. PATENT DOCUMENTS

| 4,371,871 A | 2/1983 | Adams |
| 5,278,539 A | 1/1994 | Lauterbach et al. |
| 5,533,107 A * | 7/1996 | Irwin et al. ............ 379/201.01 |
| 5,740,235 A | 4/1998 | Lester et al. |
| 5,754,111 A | 5/1998 | Garcia |
| 5,805,670 A | 9/1998 | Pons et al. |
| 5,896,298 A | 4/1999 | Richter |
| 5,912,947 A | 6/1999 | Langsenkamp et al. |
| 5,942,986 A | 8/1999 | Shabot et al. |
| 6,002,748 A | 12/1999 | Leichner |

(Continued)

FOREIGN PATENT DOCUMENTS

EP      00736989 A3    10/1996

(Continued)

OTHER PUBLICATIONS

No Author, Health Management Technology, vol. 24, No. 8, pp. 48, 203 Nelson Publishing.

(Continued)

*Primary Examiner*—Joseph Feild  
*Assistant Examiner*—Huy D Nguyen  
(74) *Attorney, Agent, or Firm*—R. Lewis Gable; Cowan, Liebowitz & Latman

(57) ABSTRACT

There is disclosed a method and apparatus for transmitting a message to at least one group of users selected from a population of the users. The method comprises the steps of assigning to each member of the one group a common characteristic or indication, collecting from each member of the population an address to which the message may be sent, selecting the common characteristic of a group of message recipients and determining therefrom the users of a particular group or groups based upon the selected common characteristic, whereby messages may be quickly and efficiently sent to all of the users of the selected group(s).

20 Claims, 6 Drawing Sheets

U.S. PATENT DOCUMENTS

| | | | |
|---|---|---|---|
| 6,151,385 A | 11/2000 | Reich et al. | |
| 6,201,856 B1 | 3/2001 | Orwick et al. | |
| 6,269,249 B1 | 7/2001 | Ochiai | |
| 6,269,369 B1 | 7/2001 | Robertson | |
| 6,295,346 B1 | 9/2001 | Markowitz et al. | |
| 6,366,771 B1 * | 4/2002 | Angle et al. | 455/414.1 |
| 6,400,810 B1 | 6/2002 | Skladman et al. | |
| 6,400,942 B1 * | 6/2002 | Hansson et al. | 455/426.1 |
| 6,405,135 B1 | 6/2002 | Adriany et al. | |
| 6,405,204 B1 | 6/2002 | Baker et al. | |
| 6,442,241 B1 | 8/2002 | Tsumpes | |
| 6,496,568 B1 | 12/2002 | Nelson | |
| 6,504,909 B1 | 1/2003 | Cook et al. | |
| 6,509,833 B2 | 1/2003 | Tate | |
| 6,510,207 B1 | 1/2003 | Cannon et al. | |
| 6,529,136 B2 | 3/2003 | Cao et al. | |
| 6,535,121 B2 | 3/2003 | Matheny | |
| 6,539,302 B1 | 3/2003 | Bender et al. | |
| 6,545,606 B2 | 4/2003 | Piri et al. | |
| 6,549,904 B1 | 4/2003 | Ortega et al. | |
| 6,556,664 B1 | 4/2003 | Langsenkamp | |
| 6,563,910 B2 | 5/2003 | Menard et al. | |
| 6,574,480 B1 | 6/2003 | Foladare et al. | |
| 6,574,630 B1 | 6/2003 | Augustine et al. | |
| 6,580,784 B2 | 6/2003 | Rodriguez et al. | |
| 6,587,851 B1 | 7/2003 | Ditcharo et al. | |
| 6,590,507 B2 | 7/2003 | Burns | |
| 6,591,094 B1 | 7/2003 | Bentley | |
| 6,606,502 B1 * | 8/2003 | Chung Kam Chung et al. | 455/466 |
| 6,631,363 B1 | 10/2003 | Brown et al. | |
| 6,650,429 B2 | 11/2003 | Marshall et al. | |
| 6,684,265 B2 | 1/2004 | Graf | |
| 6,700,482 B2 | 3/2004 | Ververs et al. | |
| 6,781,963 B2 * | 8/2004 | Crockett et al. | 370/260 |
| 2001/0014607 A1 * | 8/2001 | Furukawa et al. | 455/436 |
| 2001/0046064 A1 | 11/2001 | Kutakowski et al. | |
| 2002/0002590 A1 | 1/2002 | King | |
| 2002/0052194 A1 * | 5/2002 | Sivakumar | 455/412 |
| 2002/0059457 A1 | 5/2002 | Ballard et al. | |
| 2002/0087740 A1 | 7/2002 | Castanho et al. | |
| 2002/0128033 A1 * | 9/2002 | Burgess | 455/528 |
| 2003/0052778 A1 | 3/2003 | Wong | |
| 2003/0069002 A1 | 4/2003 | Hunter et al. | |
| 2003/0076932 A1 | 4/2003 | Felix | |
| 2003/0140091 A1 * | 7/2003 | Himmel et al. | 709/203 |
| 2003/0141971 A1 | 7/2003 | Heiken | |
| 2003/0153343 A1 * | 8/2003 | Crockett et al. | 455/519 |
| 2003/0231619 A1 | 12/2003 | Akturk | |
| 2004/0015294 A1 | 1/2004 | Kirtland | |
| 2004/0019647 A1 | 1/2004 | Lee | |
| 2006/0046699 A1 * | 3/2006 | Guyot et al. | 455/414.1 |

FOREIGN PATENT DOCUMENTS

| | | |
|---|---|---|
| EP | 01033844 A2 | 9/2000 |
| EP | 01143361 A1 | 10/2001 |
| EP | 01239385 A1 | 9/2002 |
| EP | 00867846 B1 | 6/2003 |
| EP | 01239385 B1 | 7/2003 |
| EP | 01339002 A1 | 8/2003 |
| EP | 01343103 A2 | 9/2003 |
| WO | 200045607/WO A1 | 8/2000 |
| WO | 200113670/WO A1 | 2/2001 |
| WO | 2001024059/WO A3 | 4/2001 |
| WO | 200149368/WO A1 | 7/2001 |
| WO | 200193667-WO A1 | 12/2001 |
| WO | 2002017192/WO A1 | 2/2002 |
| WO | 2002037393/WO A2 | 5/2002 |
| WO | 2002071365/WO A1 | 9/2002 |
| WO | 2002073478/WO A1 | 9/2002 |
| WO | 2002082402/WO A3 | 10/2002 |
| WO | 2003053006/WO A1 | 6/2003 |

OTHER PUBLICATIONS

No Author, Electrosvyaz, No. 12, pp. 46, 2001.
Kym Secrist, Control Engineering v. 44, n. 3, Mid-Fed. 1997, pp. 27-28.
Dan Verton, Computerworld, v. 37, n. 35, Sep. 1, 2003, pp. 10.
W.T. Brandon, Space Communications, vol. 10. No. 3-4, 2002, pp. 113-118.
Shafer et al., Journal of Atmospheric and Oceanic Technology, vol. 17, No. 4, Apr. 2000, pp. 474-494.
Shulzrinne et al., Proceedings of the SPIE—The International Society for Optical Engineering, vol. 4868, 2002, pp. 255-268.
I.E. McDermott, Searcher, vol. 9, No. 9, Oct. 2001, pp. 58-62.
Schulzrinne et al., IEEE Internet Computing, vol. 6, No. 3, May-Jun. 2002, pp. 39-47.

* cited by examiner registration database control panel 80

Database Function

View Database

Send Warning email to registrants

Subject

Zip Code(s) (Please select one of the following options:)

82 — ◉ Zip codes by region

- 82a — Northeast & Central Queens
- 82b — Northeast Brooklyn
- Northern Bronx
- Northern Manhattan
- Northwest Brooklyn
- Northwest Queens
- Southeast Queens
- Southern Bronx
- 82n — Southern Brooklyn
- Southern Manhattan 84a — Add>>
84b — <<Remove 83 — ◉ Store region

FIG. 3A registration database control panel 80

Database Function

View Database

Send Warning email to registrants

Subject

Zip Code(s) (Please select one of the following options:)

82 — ◉ Zip codes by region

- 82a — Northeast & Central Queens
- 82b — Northern Bronx
- Northern Manhattan
- Northwest Brooklyn
- Northwest Queens
- Southeast Queens
- Southern Bronx
- 82n — Southern Brooklyn
- Staten Island 84a — Add>>
84b — <<Remove 86a — Southern Manhattan
86b — Northeast Brooklyn
86

Add regions from the list on the left in the priority order you want the e-mails to be sent.
Only users with zip codes that match the selected region(s) will receive the message.

92 — ⊙ Type zip code(s) ☐ — 93
Enter multiple zip codes separated by commas.

94 — ⊙ Send to ALL zip codes By selecting this option, a warning e-mail will be forwarded to ALL registrants in the database.

Send e-mails to these areas first, regardless of the above zip codes selection:
95a — ☐ Major transportation hubs
95b — ☐ City Landmarks Message             Warning Type
              96 — [Aircraft crashes       ⇕]

97 — ☐                        [Count Characters]

☐ (message may not exceed 150 characters)
Type warning message in the above text area. You may also select a warning type
from the pull-down menu, which places a warning in the text area. You may edit the
message at any time before sending it.
              98 — [Send Message] [Reset] — 99

Warning: When you click the "Send Message" button, an e-mail will be forwarded to all
or selected registrants. This process cannot be stopped or cancelled.
Please click the button ONLY ONCE.

⊙ Type zip code(s) ☐
Enter multiple zip codes separated by commas.

94 — ⊙ Send to ALL zip codes    ✓ Aircraft crashes — 100a
                                Building Failure — 100b
Send e-mails to these areas     Dam Breaks
☐ Major transportation hubs     Earthquakes
☐ City Landmarks                Environmental- Air/water soil pollution
Message                         Fire
                                Hazardous Materials
                                Health & Biological- Anthrax
                                Health & Biological- Botulism
                                Health & Biological- Cyanide
                                Health & Biological- Epidemics
☐ (message may not exceed 150 char) Health & Biological- Epizootics      100'
Type warning message in th      Health & Biological- Poisonings Intoxication
from the pull-down menu, wh     Health & Biological- Ricin
message at any time before      Health & Biological- Sarin
                                Health & Biological- Smallpox
                         [ S    Health & Biological- VX
Warning: When you click the     Industrial Accidents- BLEVE
      or selected regis         Industrial Accidents- Explosions
                                Industrial Accidents- Gas leaks         100n
                         Pl     Industrial Accidents- Radioactive emissions
                                              ▼
                                                                 100

○ Type zip code(s) [                    ]
Enter multiple zip codes separated by commas.

○ Send to ALL zip codes    By selecting this option, a warning e-mail will be forwarded to ALL registrants in the database.

Send e-mails to these areas first, regardless of the above zip codes selection:
☐ Major transportation hubs
☐ City Landmarks Message                    Warning Type
                           [Health & Biological- Ricin          ⇕]

97 — [Emergency:[Health & Biological-Ricin], stay away from the affected area. Avoid enclosed areas. Follow instructions from emerg. crew.]       102
                                                                [Count Characters]

103 — [138] (message may not exceed 150 characters)

Type warning message in the above text area. You may also select a warning type from the pull-down menu, which places a warning in the text area. You may edit the message at any time before sending it.

98 — [ Send Message ] [ Reset ] — 99

Warning: When you click the "Send Message" button, an e-mail will be forwarded to all or selected registrants. This process cannot be stopped or cancelled.
Please click the button ONLY ONCE.

FIG.3E

APPARATUS AND METHOD FOR BROADCASTING MESSAGES TO SELECTED GROUP(S) OF USERS

FIELD OF THE INVENTION

This invention relates to broadcasting to a group(s) or subset(s) of users in a manner that effects the efficient selection of the user to receive the message and to permit the transmitted message to be customized to the needs of the users.

BACKGROUND OF THE INVENTION

Since Sep. 11, 2001, the need to warn people of threatened property damage and personal injury from a variety of natural and man-made potential disasters has been seen as a high priority need. Typical threatened disasters include natural disasters from weather, such as tornados, hurricanes, mud slides, floods and wind shear, as well as man made disasters, such as those resulting from terrorist attacks, fire, radiation leakage, toxic chemical leakage or bomb threats. Ordinarily, the earlier people and communities are alerted to such threats so that they can make preparations for protecting themselves from them, the less the property damage or personal injury resulting from these threatened disasters.

It is estimated by the partnership for Public Warning that nearly a thousand people involved in the September 11 attack could have escaped the second tower in time to save their lives, had they been able to receive accurate information about what was going on. When the first plane hit, it blew out the electricity, phone lines, and cellular towers. This meant the occupants had no sources of information, relying instead on the inaccurate instructions of the building superintendent, who told everyone to remain at their desks.

Further, the Emergency Alert System (EAS) was not activated that day (for no known reason). But even if it did activate, it would have done nothing to help people most in peril, since they had no access to radio and TV, the only mediums the EAS is authorized to use.

What was needed was a ubiquitous mobile system that could be used in the absence of power and phone lines, to reach people in high risk areas, with government sanctioned information about the emergency, customized per location, and specific, ongoing instructions for post event safety.

There are already in place and operational a variety of prior art systems for warning or alerting people to disaster threats. These most prominently include the public media, such as radio and television news and weather broadcasts and the weather radio system operated by the National Weather Service. These systems, however, are subject to deficiencies because they require radio transmissions broadcast from transmitters located in the region of the disaster, and require that individuals have their radio or television equipment turned on, operating and being observed by the individuals. Persons who are not operating such equipment do not receive an alert, unless they are fortunate enough to have someone nearby who has received the alert and who is aware of their presence and goes to the effort to give them a personal warning.

Additionally, there are siren warning systems to alert members of the public who are in danger of a threatened disaster. These systems are also subject to deficiencies because some areas are not equipped with such siren warning systems and the sirens can be difficult or impossible to hear when there is ambient noise, such as from construction or traffic or a heavy storm or when the sirens are simply too far off to be heard.

There are also a variety of additional warning systems, mostly radio operated, which require specialized equipment. Very few people purchase such equipment and therefore these systems are not effective in providing sufficient warning to large numbers of people.

The infrastructure of the United States and many other countries currently includes a national telephone system which provides a communication system which is widely distributed and provides the most personal route to connection to the greatest number of people.

However, the present warning systems suffer a number of deficiencies. First, they do not have the capability of automatically sending a message to a particular group of message recipients. In emergency situations, it is important to be able to warn or to alert those who are in immediate danger and/or those recipients who are police or firefighters and who would respond to such emergencies. Further, it is important for those in authority and who are authorized to respond quickly to such emergencies, be alerted first. Others, for example those who are in harms way, must also be alerted though at a latter time. Thus, it would be important to have an effective warning system with the ability to prioritize the messages that are broadcast; for example, it would be desirable to send a first set of messages to certain users, e.g., officers in a fire department or the police, before sending a set of messages to those in the area, which is threatened by the emergency.

Still further, it is appreciated that each group of users may require a different message. In such a case, the broadcast alerting system would need to send different, customized messages to each of these groups of people, e.g., a first message to the police and another, different message to those residing in the region where the emergency has occurred.

SUMMARY OF THE INVENTION

It is therefore an object of this invention to provide a new and improved message broadcast system that is capable of quickly and efficiently sending a message via a data transmission medium to a selected number of message recipients or users.

It is a further object of this invention to provide a new and improved message broadcast system that is capable of customizing the transmitted message to the particular group of people and/or to the nature of the event that may potentially affect this group.

It is a still further object of this invention to provide a new and improved message broadcast system that can prioritize the sending of a message to that one of the groups of people, which has the greatest need to receive the message.

In accordance with these and other objects of this invention, a method of transmitting a message to at least one group of users selected from a population of users is disclosed. The method comprises assigning to each member of the one group a common characteristic, collecting from each member of the population an address to which the message may be sent, selecting the common characteristic, determining each user of the group according to the selected common characteristic, and selecting a message and transmitting the selected message to each member of the selected group.

In accordance with another object of this invention, the common characteristic may include a region to which the user is associated.

In accordance with a further object of this invention, the step of transmitting a message captures the stored address and inserts it into the message, whereby the message is sent to each user of the group with the common characteristic.

In accordance with a still further aspect of this invention, apparatus is disclosed for transmitting a message to a plurality of group(s) of users selected from a population of users. The apparatus comprises a database; and a server programmed to implement the following steps: 1) facilitating each member of the population of users to transmit via an Internet and to store in said database an address whereby a message may be sent to that user, and 2) facilitating each user to select a characteristic of the group to which the user belongs and to store the selected characteristic in the database.

In accordance with a further object of this invention, the server is further programmed to facilitate an administrator to select and to transmit via the Internet a characteristic to the server, determining each user of the group which has the selected common characteristic, and transmitting a selected message to each determined member of the group with the common characteristic.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views and in which:

FIGS. 3A and B, and C-E respectively illustrate a first web page or screen showing how the group characteristic for a particular message is selected, and how a message is selected and/or composed.

DETAILED DESCRIPTION OF A PREFERRED EMBODIMENT OF THE INVENTION

Figure 1:
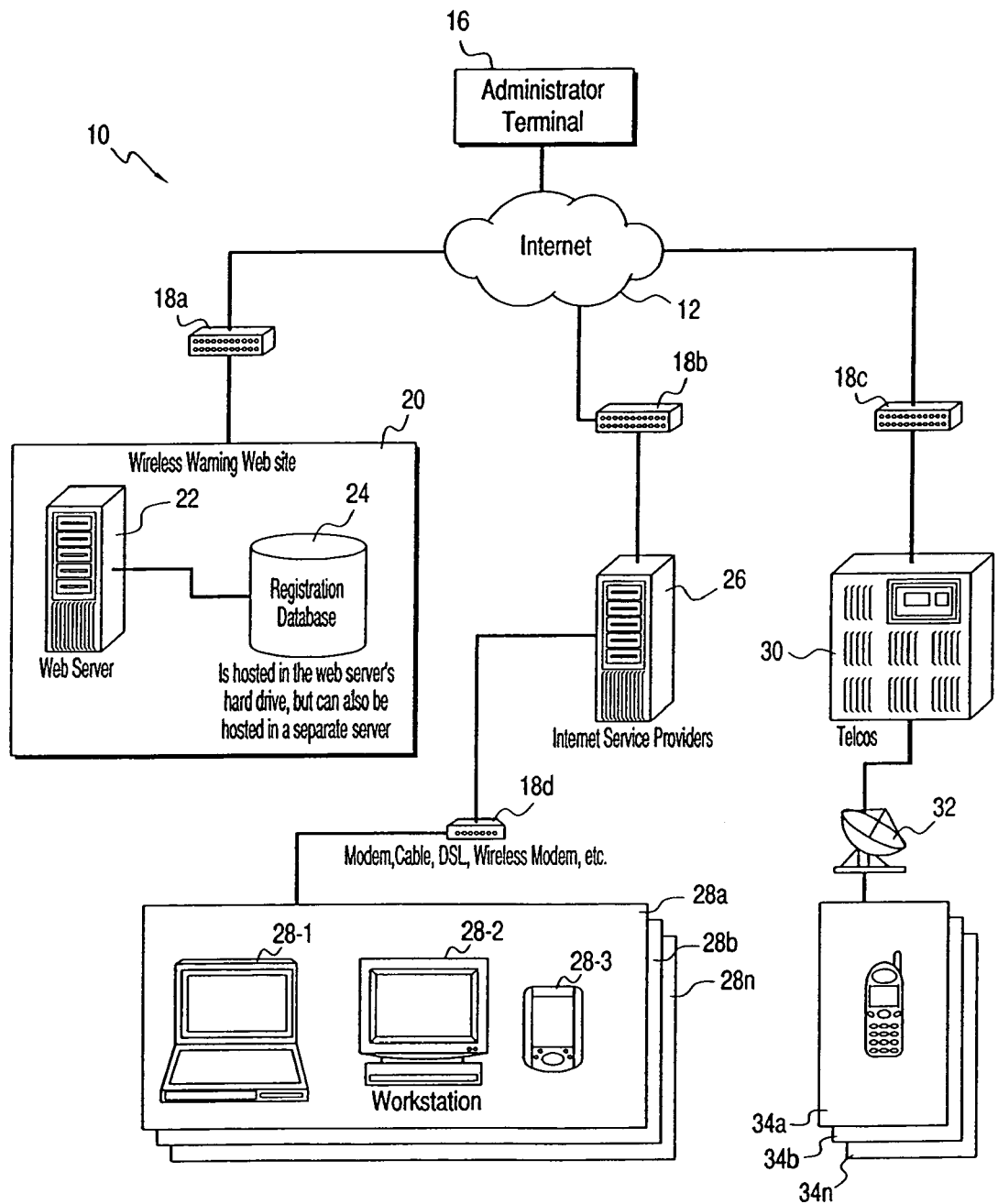
FIG. 1 is a functional block diagram illustrating how a user's terminal, an administrator's terminal and a server of a website are used to send messages to a group or groups of users where each group has a common characteristic.

Referring now to the drawings and in particular to FIG. 1, there is shown an illustrative embodiment of this invention which uses a message broadcast system 10 to broadcast or transmit messages to a selected group(s) or subset(s) of a population of users or message recipients. The system 10 comprises a plurality of user terminals 28a-n and 34a-n, and an administrator terminal 16, each of which is interconnected by a bi-directional network to a website 20. The website 20 in turn comprises a web server 22 and a registration database 24 where, as will be explained below in greater detail, data related to the users is stored. The web server 22 operates as will be explained in detail below to transmit or broadcast messages in a first direction either via a modem 18a, the Internet 12, a modem 18b and an Internet Service Provider (ISP) 26 to the terminals 28a-n, or via the modem 18a, the Internet 12, a modem 18c, a telecommunications provider 30 and a wireless communication device 32 to the terminals 34a-n. The system 10 is capable of transmitting text and voice messages. To transmit text messages, the system 10 utilizes the ISP 26 and a variety of the terminals 28a-n such as a personal computer (PC) 28-1, a workstation 28-2 and/or a personal digital assistant (PDA) 28-3. In a wireless voice embodiment, the system 10 includes cell phones 34a-n, the telecommunications provider 30 and the wireless communication device 32. As will be explained below, each of the terminals 28a-n and 34a-n can transmit signals in a second opposite direction via the modems and the Internet 12 to the website 20.

Figure 2A:
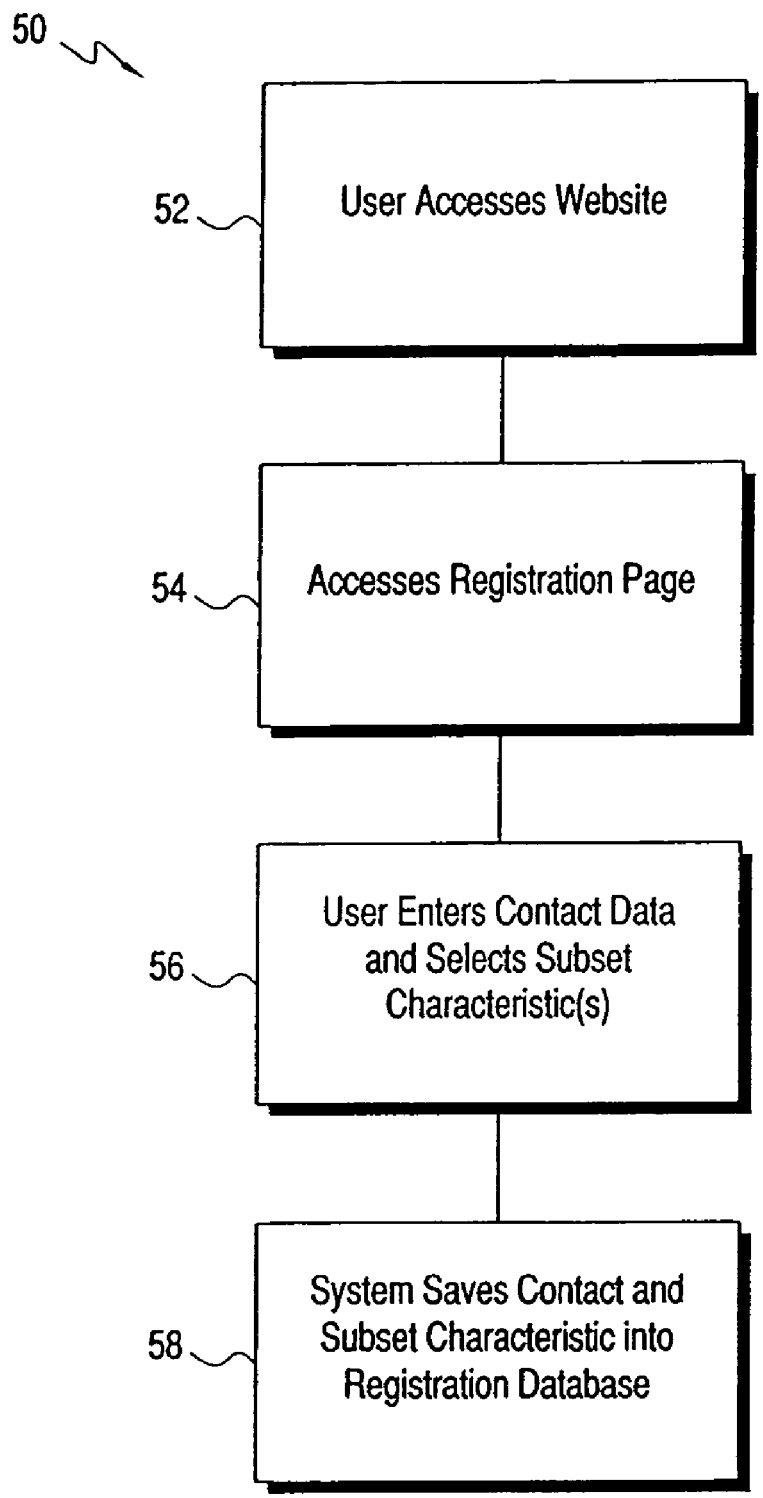
FIGS. 2A and B are flow diagrams, which respectively prompt a user to input contact data and to identify the characteristic of the group to which the user is associate, and to transmit a message to each member of a group having the characteristic selected by the administrator.

Referring now to FIG. 2A, there is disclosed how the web server 22 may be set up as a website 20, which each of the users may access to input contact and other data into the registration database 24. First in step 52, the user accesses the website 20 by use of the terminals 28a-n and 34a-n and, in step 54, accesses from the registration database 24 a web page to be displayed on the terminal 28 or 34 in the form of the registration page or screen 80, as shown in FIG. 3A. In an illustrative embodiment of this invention, the web server 22 is programmed to receive and store a data characteristic or indication of a group or subset of the users. In an illustrative embodiment of this invention, the characteristic or common criteria of the group or subset of users may take the form of a zip code of the user's residence, place of business or related in some fashion to the user. Upon display in step 54 of the registration screen 80, the user may manually actuate in step 56 a button 82 to permit the user to select certain region(s) that correspond to a particular zip code(s). As shown in FIG. 3A, various regions of the boroughs of New York City are set out, each region corresponding to a particular zip code(s). To select one or more such regions, the user clicks on one of the regions 82a-n and associates that region to the user's contact data by clicking on the add button 84a, whereby as shown in FIG. 3B, these selected regions, e.g. southern Manhattan 86a and northern Brooklyn 86b, are added to a display field 86.

Further, the data secured from the user would also include the web addresses of the terminals 28, as well as the telephone numbers of the cell phones 34, whereby messages may be directed to certain terminals as set by the user. Though not shown in FIGS. 3A, B and C, the web pages are shown to the user at their terminals 28a-n and 34a-n to prompt the user to input contact data, an indication of the group or subset characteristic as described above, and the addresses of the terminals 28 and 34. After the contact data, the subset characteristic and the terminal addresses have been entered in step 56, the user actuates a button 83 (FIG. 2A) to save in step 58 the user's contact data and the subset characteristic to the registration database 24.

Figure 2B:
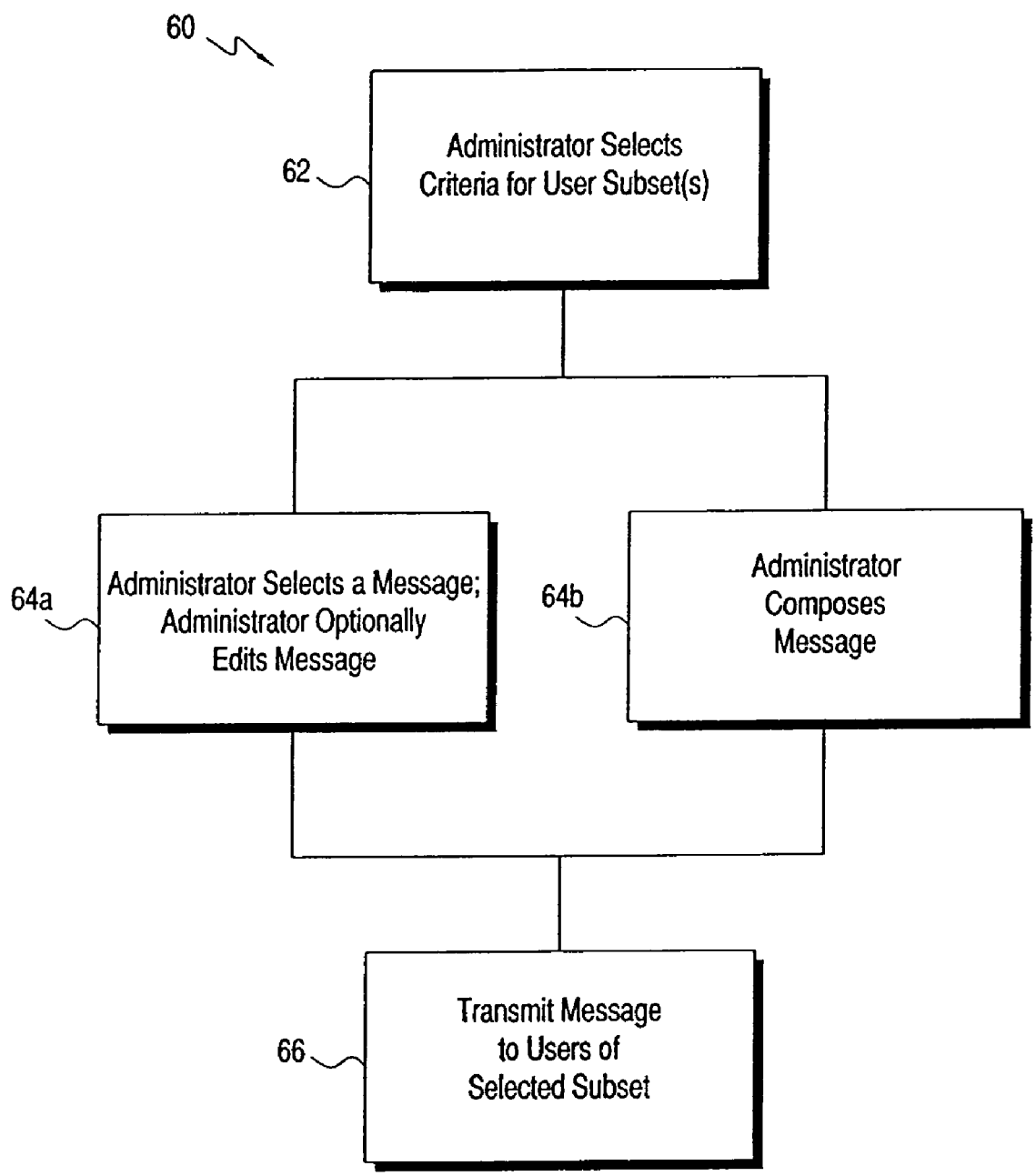

Referring now to FIG. 2B, there is shown a process by which an administrator using its administrator terminal 16 as shown in FIG. 1 is enabled to provide a selective message to be sent to a selected one or more of the subset(s) or group(s) of users. As shown in FIG. 2B, the administrator using his terminal 16 downloads in step 62 a screen 90 as shown in each of FIGS. 3C, D and E. As shown particularly in FIG. 2B, the administrator may selectively choose in step 62 the criteria for the user subset(s) or group(s) by clicking on a button 92 of the screen 90 (FIG. 3C). In the illustrative embodiment where the group criteria is in the form of a geographical region and/or zip code(s), the administrator enters at least one zip code into the field 93. The administrator may also enter a number or plurality of zip codes and may place them in the order in which messages are to be transmitted to the groups of users that are identified by those zip codes.

After selecting and entering the criteria for the user subset, the administrator is then ready to select in steps 64a and b a message to the users of the selected group of users. The administrator may provide the message to be sent to a selected group or subset of users in at least two different ways. In step 64a as shown in FIG. 2B, the administrator may select a message to be broadcast from a group of possible messages. In particular, the user may click on its "warning type field" 96 (FIG. 3C), where a pop up menu 100 appears upon the screen 90 as shown in FIG. 3D listing the various types of warnings or messages that may be sent. The administrator selects one of the messages by clicking thereon to illustratively select the "health & biological-Ricin" message 100'. Optionally, the administrator may display in the field 97 a previously selected message and edit it. Alternatively, the administrator may compose in step 64b and type a particular message in its data input field 97 as shown in FIG. 3C.

The administrator also has the option to actuate in step 66 a button 98 (FIG. 3E), whereby messages are sent to all of the entered zip codes as shown in FIG. 3C. The administrator is also given the option to not only send messages to the zip code or codes, but may also send the message to selected other areas of particular priority. For example, the administrator may actuate a button 95a, whereby the message is sent to the major transportation hubs, or a button 95b whereby the message is sent to the landmarks of a particular city. A reset button 99 is also displayed by the screen 90, providing the administrator an opportunity to change and/or correct the various settings that the administrator has made in step 62, 64 and 66.

As shown in FIG. 3E, there is associated with the message entry field 97, a field 102 which permits the web server 22 to count the characters comprising the messages entered in the message field 97 whereby the number of characters in a message may be limited. The current number of characters in the message being prepared and the total number of permissible characters are shown in the field 103 to the administrator.

In step 66 (FIG. 2B), the web server 22 (FIG. 1) accesses the contact data and the group criteria as stored in the registration database 24 and, using the address or addresses of each user, transmits a message to each user of the selected group or subset. As shown in FIG. 1, the web server 22 transmits these messages via the Internet 12 to each of the ISPs 26 and/or the telecommunication provider 30. Each transmitted message, as explained above, includes an address identifying the particular terminal 28a-n or 34a-n that the user has designated for receipt of its message. For example the selected terminal may take the form of the PC 28-1, the work station 28-2 or a PDA 28-3. It is contemplated that a particular user may have a terminal 28 for receiving text messages but also may have a portable wireless device such as a cell phone 34 for receiving voice messages. In that instance, the message would bear the telephone number of that cell phone 34 and would be sent via the telecommunication provider 30, the wireless transmission system 32 to one of the cell phones 34.

In a preferred embodiment of this invention, the short message service (SMS) is used as the primary mode of communications over cell phones dramatically thereby reducing the overages in capacity felt in both September 11 and the 2003 blackout in the Northeast. A public service campaign to educate citizens about the system would necessarily admonish people to use only SMS in times of emergency, and only with "necessary" communications. This must be done to protect the integrity of the cell phone system, and prevent it from collapsing beneath the weight of voice and multimedia messaging, such as photos and other images.

In the illustrative embodiment of this invention described above, the criteria, attribute or characteristic of the group or subset was selected as a zip code. In that embodiment, the administrator can quickly address a plurality of messages to each of the users within the selected group or subset, e.g., to each member that is within the selected zip code or zip codes. However, this invention is not limited to the use of zip codes as categories. For example the criteria could take the form of the title or function of the user. For example if this invention were to be employed to send messages of some emergency or disaster, the criteria maybe selected in terms of the function or title of the users. If the contemplated users were police or fireman, the criteria maybe selected in terms of the rank or function of a particular officer. For example, it may be desired to send messages only to those firemen or policemen of a certain rank. As indicated above, the messages may be sent in order of priority. In a contemplated disaster, it would be desirable to send the first warning messages of an accident or disaster to high ranking officers or firemen so that they may take immediate control of the situation. In a further illustrative example of this invention as related to the sale of securities, the group criteria may identify users who own a particular security. Thus this invention could be used to send messages about a certain stock to the holders of that stock. In this example, the group criteria would be ownership of that stock.

This invention is of use when one needs to instantly reach hundreds or even millions of people simultaneously, wherever those people may be scattered. The messages can be sent to selected recipients dependent on the characteristics or identifications of a recipient, including location, ranking, title or specific informational requests by recipient, such weather, traffic, horse races, or specific lottery drawings. Other uses include localized rush hour alerts (tie ups at one tunnel, so use another) and classify users by those zip codes in which travelers are most interested in, as well as bridges, tunnels, and/or highways. Messages may be broadcast from schools (no school today for certain grades) where schools or students are classified by zip codes, by school grade, or by a particular teacher. Corporate broadcasts may be made to employees around the world, by title, country, division, or those most affected by a certain type of news or event. Messages may be sent that warn of disease outbreaks to people who have recently traveled to a certain country, were recently diagnosed with related symptoms, to patients of a certain doctor, or to those who have recently been on a plane with a highly contagious passenger.

In a further application, this invention may also be applied to other events. In the context of reporting results of racing events, the group criteria may identify users who would like to be informed of races that take place on a given day, at a certain track, during a specific race or races, or featuring a given horse or rider. In the example of reporting, the results of lotteries, the group may identify users who would like to be informed of lottery results in given states, or of multi-state lottery games, or games ending on specific dates or succession of dates that winning numbers are announced. In the context of scheduling of airline flights, the group criteria may identify users who would like to be informed of departure and arrival times, as well as delays, cancellations, and alternative available flights. This invention could be adapted to report the results of sporting events, where the group criteria relates to selected teams, leagues, players, or school teams, and scores by inning, quarter, or the whole game. This invention also has application to reporting election results, and weather forecasts for certain regions.

Although the present invention has been described in terms of various embodiments, it is not intended that the invention be limited to those embodiments. Modification within the spirit of the invention will be apparent to those skilled in the art. The scope of the present invention is defined by the claims that follow.

I claim:

1. A method in a wireless communications system for transmitting a plurality of messages bearing information about an event to a plurality of users groups of, said method comprising the steps of:
   a) dedicating each of a plurality of groups of users to include at least one first user and one second user, transmitting a first message to said one first user and a second message to said one second user, at least one message bearing information that is related to at least one group;
   b) registering each user to each of the plurality of groups to receive messages bearing the information related to the one group;
   c) accessing from each registered user its address to enable each registered user to receive at least one message in a wireless device;
   d) selecting at least one of the plurality of groups; and
   e) transmitting to the accessed address of each registered user of the selected group the one message bearing information related to the information of the selected one group wherein there's included a further step of ranking and transmitting to said first user and said second user with respect to each other as to which of the first and second users of each group will receive first its message.

2. The method of transmitting a plurality of messages as claimed in claim 1, wherein the subject matter related to the selected one group is selected from a set comprising an event, a natural disaster, weather condition, police activity, terrorist attack, the price of a security, an on-time airplane system and/or the outcome of a sports event.

3. The method of transmitting a plurality of messages as claimed in claim 1, wherein an administrator of said method composes each of the messages transmitted to the plurality of users.

4. The method of transmitting a plurality of messages as claimed in claim 1, wherein the subject matter of the selected one group identifies the geographic location to which the message bearing the information is transmitted.

5. The method of transmitting a plurality of messages as claimed in claim 4, wherein the geographic location is defined by its zip code.

6. The method of transmitting a plurality of messages as claimed in claim 1, wherein the subject matter of the selected one group is selected from a set comprising a natural disaster, a terrorist attach and a utility failure, and there is further included a step of limiting the length and/or the number of messages being sent over a communications network to each of the selected one group of members to thereby prevent the overloading of the communications network.

7. The method of transmitting a plurality of users as claimed in claim 1, wherein the information of the selected one group is selected from a set comprising natural disasters or terrorist attacks, and a plurality of users are selected from a set comprising firemen and/or policemen, and are ranked whereby messages are first sent to officers of a higher rank and messages are sent later to the officers of a lower rank.

8. The method of transmitting a plurality of messages as claimed in claim 1, wherein the information of the selected one group defined the delay of an airplane, the users of the one group are passengers on the airplane, and messages are sent to each passenger of the group bearing information indicating that the airplane has been delayed.

9. The method of transmitting a plurality of messages as claimed in claim 1, wherein step c) of accessing each registered user for its address includes the substep of downloading over a communications network a screen prompting each registered user to input its address as to whereby at least one message may be sent.

10. A system for transmitting a plurality of messages bearing like information to at least one group of users each of a plurality of groups of users including at least one first user and one second user, said system comprising;
    a) a plurality of user terminals, each of said terminals having an address;
    b) a database, the database comprising a plurality of files and
    c) a server programmed to implement the following steps:
       1) constructing the database to store a plurality of groups, each group for storing data related to a plurality of users, each user of its group being related to acorresponding one common criteria;
       2) enabling each user to register itself to receive a plurality messages bearing information related solely to the corresponding one common criteria, whereby each of the plurality of registered users that receives information related to the common criteria belonging to a corresponding one group and said one group relates only to the corresponding one criteria;
       3) storing in each cell for each user the address of the terminal for the corresponding user;
       4) the programmed server composing a message with information related to the corresponding one common criteria;
       5) selecting the messages to be transmitted according to their particular criteria, each group comprising its users who have been registered to receive information related to the common criteria; and
       6) transmitting the selected message from the programmed server over the telecommunications network of the terminal with the accessed address of the selected user of the corresponding group and rankingsaid first and said second users with respect to each other as to which of the first and second users of each group will receive its message first.

11. The system for transmitting a plurality of messages as claimed in claim 10, wherein the criteria is selected from a set comprising a natural disaster, a terrorist attack, the price of a security, and/or the outcome of a sports event.

12. The system for transmitting a plurality of messages as claimed in claim 10, wherein there is included an administrator terminal connected to said programmed server, whereby the administrator composes each of the messages transmitted to the plurality of users.

13. The system for transmitting a plurality of messages as claimed in claim 10, wherein the criteria identifies the geographical location to which the message bearing the information is transmitted.

14. The system for transmitting a plurality of messages as claimed in claim 13, wherein the geographical location is defined by its zip code.

15. The system for transmitting a plurality of messages as claimed in claim 10, wherein the criteria is selected from a set comprising a natural disaster, a terrorist attach and a utility failure, and the programmed computer limits the length and/or the number of messages being sent over a communications network to each of the selected one group of users to thereby prevent the overloading of the communications network.

16. The system for transmitting a plurality of messages as claimed in claim 10, wherein said computer is programmed to rank at least two of a plurality of users of at least one group and to transmit first the message to the user of the higher ranking and thereafter to transmit the message to the member of the lower ranking.

17. The system for transmitting a plurality of messages as claimed in claim 16, wherein said computer is programmed to select from a set comprising natural disasters or terrorist attacks, and a plurality of users are selected from a set comprising firemen and/or policemen, and to rank officers whereby messages are first sent to officers of a high rank and are sent later to the officers of a lower rank.

18. The system for transmitting a plurality of message as claimed in claim 17, wherein the criteria defines the delay of an airplane, the users of the one group are passengers on the airplane, and messages are set to each passenger of the group and bearing information indicating that the airplane had been delayed.

19. The system for transmitting a plurality of messages as claimed in claim 10, said server is programmed to access each register used for its address, and downloads over the communications network a screen prompting each registered user to input its address as to where the at least one message may be may be sent.

20. The system for transmitting a plurality of messages as claimed in claim 10, wherein said system comprises an administrator terminal, whereby an administrator can enter the information in each of the plurality messages and can set the order in which step c) transmits the plurality of messages to the users with the accessed addresses.

* * * * *

UNITED STATES PATENT AND TRADEMARK OFFICE
CERTIFICATE OF CORRECTION

| | | |
|---|---|---|
| PATENT NO. | : 7,224,957 B2 | Page 1 of 1 |
| APPLICATION NO. | : 10/509263 | |
| DATED | : May 29, 2007 | |
| INVENTOR(S) | : Shelley J. Spector | |

It is certified that error appears in the above-identified patent and that said Letters Patent is hereby corrected as shown below:

On the Title page, add Item (60)

-- Related U.S. Application Data
(60) Provisional application no. 60/455,308, filed on Mar. 17, 2003 --

Signed and Sealed this
Sixth Day of December, 2011

David J. Kappos
*Director of the United States Patent and Trademark Office*